United States Patent Office 3,647,811
Patented Mar. 7, 1972

3,647,811
PRODUCTION OF 2,2'-BIS-[1,3,4-THIADIAZOLINE-5-THIONE]
Hans-Dieter Rupp and Helmut Magerlein, Erlenbach, Germany, assignors to Glanzstoff AG, Wuppertal, Germany
No Drawing. Filed Nov. 21, 1969, Ser. No. 878,946
Claims priority, application Germany, Dec. 14, 1968, P 18 14 772.3
Int. Cl. C07d *91/62*
U.S. Cl. 260—302 SD                10 Claims

ABSTRACT OF THE DISCLOSURE

A process for the production of 2,2'-bis-[1,3,4-thiadiazoline-5-thione] by reacting oxalic acid bisamidrazone with carbon disulfide, preferably in water, at approximately room temperature up to moderately elevated temperatures. The product is useful in lithographic printing and photographic development.

According to a process disclosed by Kato and Ohta [Nippon Kagaku Zasshi, 78, pp. 1588–91 (1957), and Chem. Abstracts, 54, p. 1502 (1960)], it is possible to obtain 2,2'-bis-[1,3,4-thiadiazoline-5-thione] by reacting oxalic acid dihydrazide with carbon disulfide in an alkaline solution and then subjecting the resulting bis-dithiocarboxylate to cyclodehydration by reacting it with concentrated sulfuric acid. This known process has a number of disadvantages, including the necessity of working in two reaction stages.

It has now been found, in accordance with the present invention, that excellent results can be achieved in a much simpler manner by reacting oxalic acid bisamidrazone with carbon disulfide to achieve a direct production of the 2,2'-bis-[1,3,4-thiadiazoline-5-thione] product. This reaction, which is most conveniently carried out in an inert solvent and at moderate temperatures, requires only a single reaction stage and permits very high yields and a very pure product.

The reaction according to the invention is represented by the following equation:

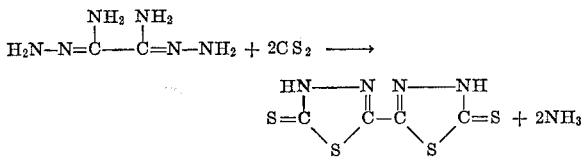

The reaction is preferably carried out with an excess of carbon disulfide, but in general it is possible to achieve good results with a molar ratio of oxalic acid bisamidrazone:carbon disulfide of about 1:2 to 1:4. The reaction is even successful with stoichiometric amounts and it is not absolutely necessary to introduce an excess of one of the two components.

The reaction proceeds readily at room temperature or only slightly elevated temperatures, e.g. at least about 15° C. and preferably about 20° C. to 80° C. It is especially desirable to work at temperatures between room temperature and the boiling point of the carbon disulfide, because the solubility of the oxalic acid bisamidrazone in a suitable reaction solvent becomes smaller at lower temperatures. On the other hand, there is a tendency to cause thermal degradation or oxidation of the oxalic acid bisamidrazone at higher temperatures, especially above 80° C., and the ultimate yield is sharply reduced if overheating occurs. For this reason, temperatures of about 20° C. up to 60 C. are especially suitable.

Conveniently the reaction is conducted under atmospheric pressure, i.e. normal pressure, but it is also possible to work at slightly elevated pressures, e.g. up to 5 atmospheres, in a closed reaction vessel or reaction system.

As inert solvents, it is desirable to select one which has a reasonably high solubilizing capacity for oxalic acid bisamidrazone and/or the 2,2'-bis-[1,3,4-thiadiazoline-5-thione] product, thereby achieving an intimate admixture of the reaction components. Water is especially suitable as the inert solvent, since it is most economical and permits an easy recovery of the reaction product. However, it is also feasible to use other inert solvents, e.g. dimethyl formamide, and it will be understood that the inert solvent merely provides a convenient liquid reaction medium without entering into the reaction itself other than as a solvent.

Since ammonia is released in the reaction, it may of course be taken up by the solvent, and in fact does tend to combine with the desired product. However, as explained hereinafter, the product is readily separated from such combined ammonia, and if desired, suitable means can be provided for withdrawing ammonia from the reaction vessel or during subsequent recovery of the product.

The oxalic acid bisamidrazone, sometimes referred to as "oxalic bisamidrazone" is a known compound which can be obtained in a conventional manner by reaction cyanogen gas (oxalic acid dinitrile of the formula

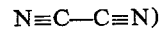

with hydrazine hydrate ($N_2H_4 \cdot H_2O$). Carbon disulfide is of course readily available from many sources.

As the 2,2'-bis-[1,3,4-thiadiazoline-5-thione] is produced during the reaction, it partly forms an ammonium salt with the ammonia which is released as a by-product. This salt is present together with the desired product as a free compound. By acidifying the reaction mixture, e.g. with hydrochloric acid, the 2,2'-bis-[1,3,4-thiadiazoline-5-thione] is completely set free from the ammonium salt.

In carrying out the synthesis according to the invention, the following procedure can be adopted by way of example. Thus, the oxalic acid bisamidrazone can first be dissolved in distilled water and then intensively stirred or mixed for several hours with the addition of an excess of carbon disulfide. The two components can be added together at the beginning of the reaction or else one or both components can be introduced gradually. Sufficient time should be allowed to permit the reaction to be completed. Thereafter, any residual carbon disulfide can be distilled off from the reaction mixture. The remaining reaction solution containing both the free product and its ammonium salt is then acidified with hydrochloric acid or any other suitable acidifying agent, thereby causing substantially all of the 2,2'-bis-[1,3,4-thiadiazoline-5-thione] to precipitate. The crude precipitated product is filtered off or otherwise separated from the solvent medium, washed free of acid and then, if necessary, recrystallized from a suitable solvent such as dimethyl formamide.

When using the process of the invention, it is possible to achieve practically quantitative yields of the 2,2'-bis-[1,3,4-thiadiazoline-5-thione] with a surprisingly high purity. The known pure product decomposes at 293° C., and even the crude product of the process disclosed herein, i.e. without recrystallization, likewise exhibits this same decomposition point of 293° C.

The following example serves to illustrate the invention without limiting it to the precise conditions disclosed therein, this example merely representing a convenient and economical preparation.

EXAMPLE 5.8 grams of oxalic acid bisamidrazone are dissolved in 300 ml. of distilled water at room temperature and then intensively mixed with 15 grams of carbon disulfide for 12 hours. Upon completion of the reaction, a portion of the resulting 2,2'-bis-[1,3,4-thiadiazoline-5-thione] has already precipitated. Excess carbon disulfide is then distilled off, and the residual reaction solution is acidified with aqueous hydrochloric acid. The resulting completely precipitated reaction product is then filtered off, washed free of acid with water and dried. The yield of 2,2'-bis-[1,3,4-thiadiazoline-5-thione] amounts to 11.65 grams (99.5% of theory), and the crude product melts with decomposition at 293° C. Further purification is readily accomplished by dissolving the crude product in dimethyl formamide and recrystallizing it therefrom.

The process of the invention offers not only an alternative method of producing 2,2'-bis-[1,3,4-thiadiazoline-5-thione] but it is also distinguished by several important advantages in comparison to the previously known process. The yield in the present process is quantitative while the yield in the known process is substantially less. Moreover, the process of the present invention can be carried out in a single reaction stage whereas the known process requires the preparation of an intermediate product in a first stage under alkaline conditions followed by a cyclization reaction in a second stage in concentrated sulfuric acid. Finally, the product of the new process disclosed hereinabove is obtained in an extremely pure state after separation from the reaction medium.

The 2,2'-bis-[1,3,4-thiadiazoline-5-thione] product is a valuable substance which is used in the production of litho-printing forms. In addition, this compound is useful in photography as an additive to developer solutions, where it has the property of preventing discoloration and turbidity of the developer solution in spite of a deposition of silver compounds.

The invention is hereby claimed as follows:

1. A process for the production of 2,2'-bis[1,3,4-thiadiazoline-5-thione] which comprises reacting oxalic acid bisamidrazone with carbon disulfide in an inert solvent at a temperature of at least about 15° C. up to about 80° C.

2. A process as claimed in claim 1 wherein said reaction is carried out in an inert solvent at a temperature of approximately 20° C. to 60° C.

3. A process as claimed in claim 2 wherein said oxalic acid bisamidrazone and carbon disulfide are reacted in a molar ratio of about 1:2 to 1:4.

4. A process as claimed in claim 2 wherein the reaction is carried out in an inert solvent selected from the class consisting of water and dimethyl formamide.

5. A process as claimed in claim 2 wherein the reaction is carried out in water as the inert solvent.

6. A process as claimed in claim 5 wherein the reaction temperature is maintained between about room temperature and the boiling point of said carbon disulfide.

7. A process as claimed in claim 2 wherein said reaction is carried out under intensive mixing.

8. A process as claimed in claim 2 wherein the reaction mixture, after completion of the reaction, is acidified and the resulting precipitate of the 2,2'-bis-[1,3,4-thiadiazoline-5-thione] product is separated from the reaction mixture.

9. A process as claimed in claim 8 wherein excess carbon disulfide is distilled off from the reaction mixture prior to its acidification.

10. A process as claimed in claim 8 wherein the separated 2,2'-bis-[1,3,4-thiadiazoline-5-thione] is recrystallized in an inert solvent.

References Cited

UNITED STATES PATENTS 3,478,045  11/1969  Hahn et al. ____ 260—302 SD

ALEX MAZEL, Primary Examiner

R. J. GALLAGHER, Assistant Examiner